United States Patent [19]

Warchocki

[11] Patent Number: 5,421,221
[45] Date of Patent: Jun. 6, 1995

[54] STACKABLE PLASTIC DAMPER

[75] Inventor: Mark Warchocki, Sanborn, N.Y.

[73] Assignee: Vibratech, Inc., Buffalo, N.Y.

[21] Appl. No.: 63,981

[22] Filed: May 19, 1993

[51] Int. Cl.⁶ ............................................. F16F 15/10
[52] U.S. Cl. .................................. 74/573 F; 74/572;
74/574; 74/573 R
[58] Field of Search ................... 160/8, 291; 188/290,
188/379, 380; 74/572, 573 F, 574, 573 R;
464/24

[56] References Cited

U.S. PATENT DOCUMENTS

| | | | |
|---|---|---|---|
| 3,373,633 | 3/1968 | Desmond et al. | 74/573 F |
| 4,432,254 | 2/1984 | Schultz | 74/574 |
| 4,691,589 | 9/1987 | Arakawa | 74/573 F |
| 4,872,369 | 10/1989 | Critton et al. | 74/573 F |
| 5,007,303 | 4/1991 | Okuzumi | 74/573 R |
| 5,058,452 | 10/1991 | El-Shafei | 74/573 F |
| 5,058,453 | 10/1991 | Graham et al. | 74/574 |
| 5,152,189 | 10/1992 | Miura et al. | 464/24 X |
| 5,197,352 | 3/1993 | Haikawa | 74/574 |
| 5,277,282 | 1/1994 | Umemura | 74/573 F X |

FOREIGN PATENT DOCUMENTS

| | | | |
|---|---|---|---|
| 4110845 | 10/1991 | Germany | 74/573 F |
| 5-44781 | 2/1993 | Japan | 74/573 F |

OTHER PUBLICATIONS

Vibratech® brochure entitled: "Viscous Speed Governors (VSG ™) and Velocity-Control Dampers".
Kinnear® brochure entitled: "UL-Labeled Fire Doors Abkar® Construction Features".
Vibratech® Spec-Data sheet entitled: "Special Doors—Rolling Door Speed Controller", dated Aug. 1990.

*Primary Examiner*—Vinh T. Luong
*Attorney, Agent, or Firm*—Hill, Steadman & Simpson

[57] ABSTRACT

A viscous damper for influencing and retarding rotation of a shaft, particularly the reel shaft of a roll-down fire door. The viscous damper unit comprises a housing having radially extending lugs, a cover for mounting to a side face of the housing, and a rotor arranged to be trapped between the cover and the housing and rotatable with respect to the housing. The rotor provides a bore for receiving the roll-down shaft for the fire door. The housing lugs are positioned to be selectively locked with respect to the framework of the fire door to prevent rotation during down rolling of the fire door. A viscous material is applied between the housing, the cover, and the rotor which retards the rotation of the rotor with respect to the housing by, shear forces. The housing is arranged to be compatible with a plurality of damping units being axially stacked along the shaft and provides aligned apertures for pinning or bolting the plurality of the housings together. In this way, the damping influence of the assembly can be adjusted by adding or subtracting units.

18 Claims, 4 Drawing Sheets

STACKABLE PLASTIC DAMPER

BACKGROUND OF THE INVENTION

The present invention relates to viscous dampers, and particularly, to rotary viscous dampers for retarding the downward closing of roll down doors such as fire doors.

It is known to provide a viscous speed governor to the shaft of a roll-up fire door to retard the unrolling speed of the fire door after actuation during a fire. Such a known fire door such as a KINNEAR ® fire door is described in FIG. 1. These governors include a housing, a disk-like rotor within the housing and a cover enclosing the rotor within the housing. The housing can include notches arranged around an outside circumference forming lugs for engagement by a rachet-like device for preventing rotation of the housing in a first rotational direction during unrolling of the door, but allowing rotation in an opposite direction during subsequent roll-up.

U.S. Pat. No. 4,432,254, issued Feb. 21, 1984, describes a viscous damper using the shear film mechanism to retard rotation. Such a damper utilizes a rotor disk arranged rotationally within a housing having inside walls in close conformity with the opposite side surface of the rotor disk. A gap between the inside walls and the surfaces of the rotor disk is filled with a viscous fluid which resists relative rotation between the rotor disk and the housing by a shear film mechanism. Thus when the housing is fixed for zero rotation with respect to the fire door frame and the rotor disk is fixed for rotation with an axle shaft or reel of the fire door, unrolling of the fire door by rotation of the axle is resisted by the viscous damper.

Prior to the present invention, the damper and rotor must be sized per the weight of the fire door, requiring a plurality of sizes and resulting increased manufacturing and inventory costs.

SUMMARY OF THE INVENTION

The present invention provides an improved structure for a viscous damping unit, particularly adaptable for retarding unrolling of a fire door after actuation. The housing of the present invention is advantageously fashioned of a composite material such as 30% glass reinforced plastic such as a fiberglass reinforced polycarbonate. The housing has integrally molded stiffening ribs to resist bending of the housing along its central axis. External engagement lugs are molded integral with the housing.

The housing includes features molded on side faces which allow ganging or coupling of units for additive damping. Advantageously, only one outer lug of the ganged units is required to be engageable to the framework.

In a preferred embodiment, the housing, rotor and cover are all made of the same material. A plurality of dampers of the present invention can be locked together in axial stacked arrangement to increase the damping influence on a shaft. Advantageously, the shaft penetrates through the coaxially aligned dampers and is keyed to the rotors of all of the dampers. The housings of the plurality of dampers are locked together via two spring pins penetrating aligned holes provided in each housing. The spring pins provide a load path to transmit the torque caused by the drag on the rotors back to a first damper engaged to the framework. The holes in the housing for receiving the spring pins are slightly elongated in a radial direction. This is to permit coupling of dampers without binding or interference due to tolerance build-up from multiple units.

By providing the ability to couple dampers together along a single shaft, the invention reduces the requirement to stock a variety of dampers such as dampers having rotors of large and small diameters. Proper selection of multiple dampers can increase and decrease damping influence without needing either a larger or smaller unit. Thus, an economy of spare parts and manufacturing is achieved.

DETAILED DESCRIPTION OF THE PREFERRED EMBODIMENTS

Figures 1, 2:
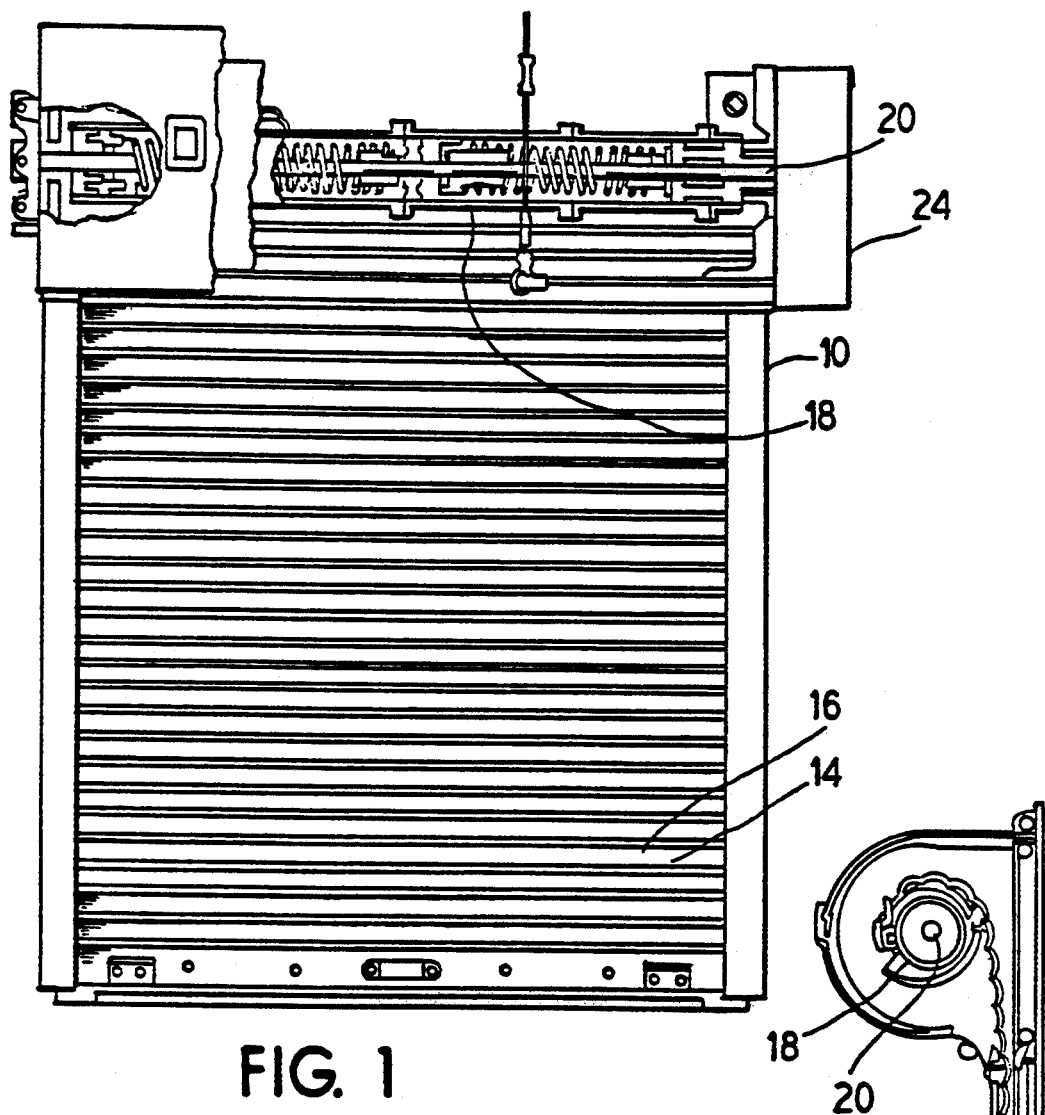
FIG. 1 is an elevational view of a prior art roll-down.
FIG. 2 is a left side view of the fire door of FIG. 1.

FIGS. 1 and 2 show a prior art fire door assembly generally at 10 comprising a fire door 14 made up of a plurality of slats 16. The fire door is shown in a downward unrolled position. The fire door 14 is rolled around a spool assembly 18 which revolves around an axle or shaft 20. On a side of the fire door assembly 10 is mounted a case 24 in which can be assembled a damper assembly 30 of the present invention.

Figure 3:
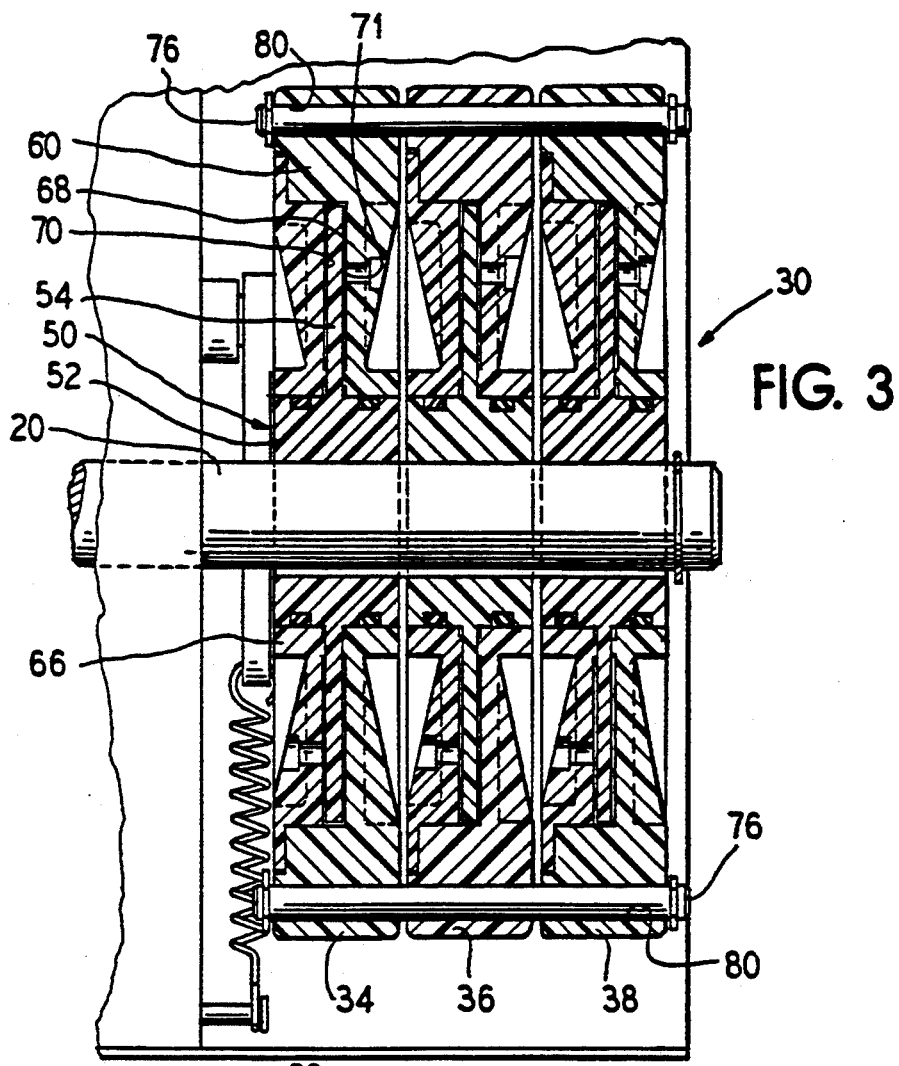
FIG. 3 is an enlarged sectional view of a stack of dampers forming a damper assembly.

FIG. 3 shows the damper assembly 30 mounted to the axle 20. The damper assembly 30 comprises a plurality of damper units 34, 36, 38. Three damper units are shown, but any number from one or greater could be used. The damping components 34, 36, 38 are configured identically. Each comprise a rotor 50 having a hub 52 fixed or keyed to the axle 20 for rotation therewith and a disk 54 extending radially around the hub 52. Each damper component also comprises a housing 60 and a cover 66 which mate together capturing the disk 54 therebetween. Between an inside surface 68 of the housing and an inside surface 70 of the cover and opposite surfaces of the disk 54, a viscous fluid 71 is injected such as silicone fluid of 1,000–600,000 centistokes. The housing 60 of each of the plurality of damper components are connected together via at least one spring pin 76 and preferably two spring pins 76 which protrude through coaxially arranged bores 80 of the housings. In lieu of the spring pins a stud or other connector could be used.

Figure 4:
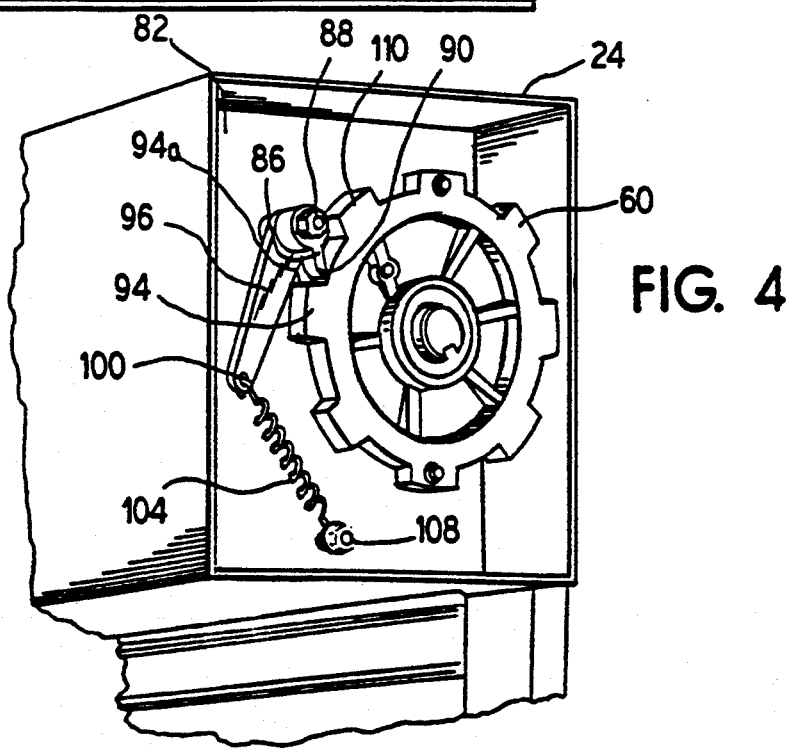
FIG. 4 is a sectional view taken generally along line IV-IV of FIG. 3.

The first inboard damper 34 closest to a back wall 82 of the door casing 24 is selectively fixed against rotation with respect to the casing 24 via a catch 86 shown more clearly in FIG. 4.

FIG. 4 illustrates the catch 86 mounted for rotation about an axle 88 and having a finger portion 90 abuttable with a lug 94 of the housing 60. The catch 86 is mounted for rotation with a lever 96 about the axle 88.

The lever 96 has an aperture 100 at a distal end from the axle 88, the aperture connecting a spring 104. The spring 104 stretches from the lever 96 to an anchor point 108. Thus, the spring biases the finger portion 90 into a position to abut a side 94a of the lug 94.

As shown in FIG. 4, the housing can rotate clockwise with a trailing lug 110 rotating the catch 86 counterclockwise against the bias of the spring 104 in a ratchet fashion to pass the finger portion over the lug 110 and succeeding lugs. However, the housing 60 cannot rotate counterclockwise as the lug 94 is stopped by the catch 86. The clockwise direction of the housing 60 would correspond to an unrolling and lowering of the fire door and the clockwise direction would correspond to a rolling-up of the fire door, thus a rolling down is accomplished with a fixed housing 60 for rotation whereas the rotor 54 itself must rotate within the housing against shear forces from the viscous material. For rolling-up the door, the entire housing 60 and rotor 54 can rotate together without the necessity to overcome the shear forces of the viscous fluid.

Figure 5:
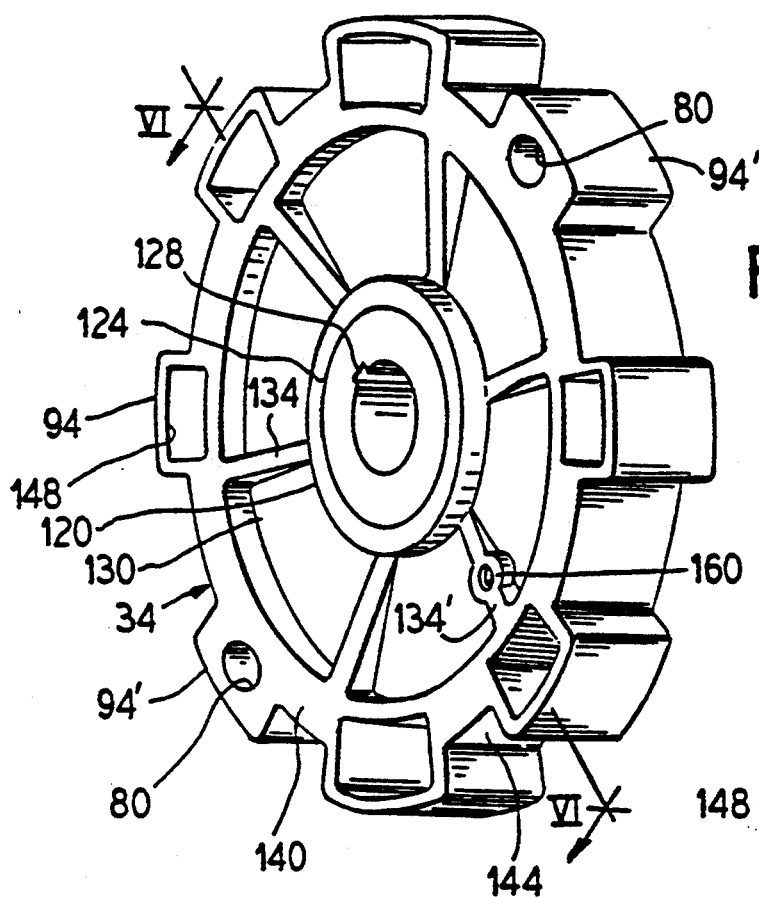
FIG. 5 is a perspective view of a housing of the damper assembly of FIG. 3.

FIG. 5 shows a damper assembly 34 of the present invention. The housing 60 is preferably made of 30% glass reinforced composite material, such as reinforced plastic. A fiberglass reinforced polycarbonate such as LEXAN 3413 or VALOX 553 can be used. The housing has a central hub or journal portion 120 having a bore 124 for receiving the hub 52 of the rotor 50. The hub 52 provides a keyway 128 for locking the rotor 50 to the shaft 20 to rotate therewith. Extending radially from the central hub 120 is a disk portion 130 having reinforcing gussets 134 applied around a circumference at 60° spacing. These gussets give the housing 60 structural stiffness to resist bending and flexing. Arranged around an outside circumference of the disk 130 is a ring portion 140.

Radially extending from the ring 140 portion, at 45° spacings are the lugs 94. The lugs 94 have an approximate rectangular shape providing approximately rectangular notches 144 between adjacent lugs 94. The lugs 94 have square channels 148 penetrating therethrough. These square channels 148 reduce the necessary materials of construction for the housing 60 and also effect weight reduction for the unit. At least one lug 94' and preferably two lugs 94' have the bores 80 located therethrough for attaching adjacent damper units 34, 36, 38. A viscous material fill fitting 160 is provided through one modified reinforcing gusset 134'. Through this fitting, the viscous material can be injected into the space between the housing 60 and the disk 54 of the rotor 50.

Figure 6:
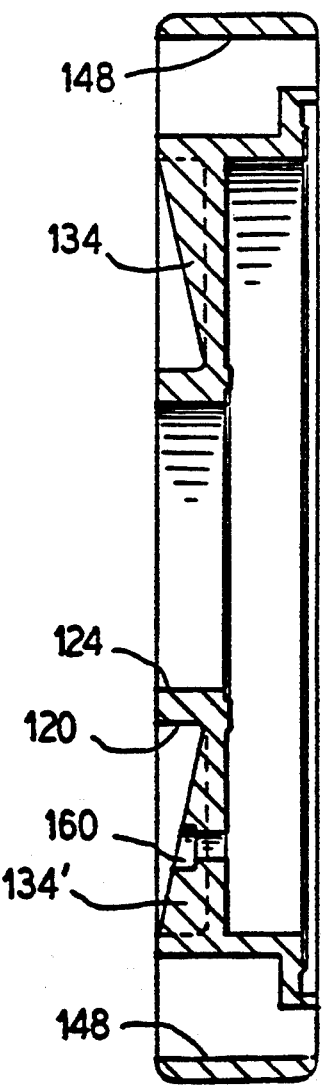
FIG. 6 is an enlarged sectional view of the housing assembly of FIG. 5.

FIG. 6 illustrates a section through the housing 60 wherein the channels 148 are shown as being rectilinear with varying width.

Figure 7:
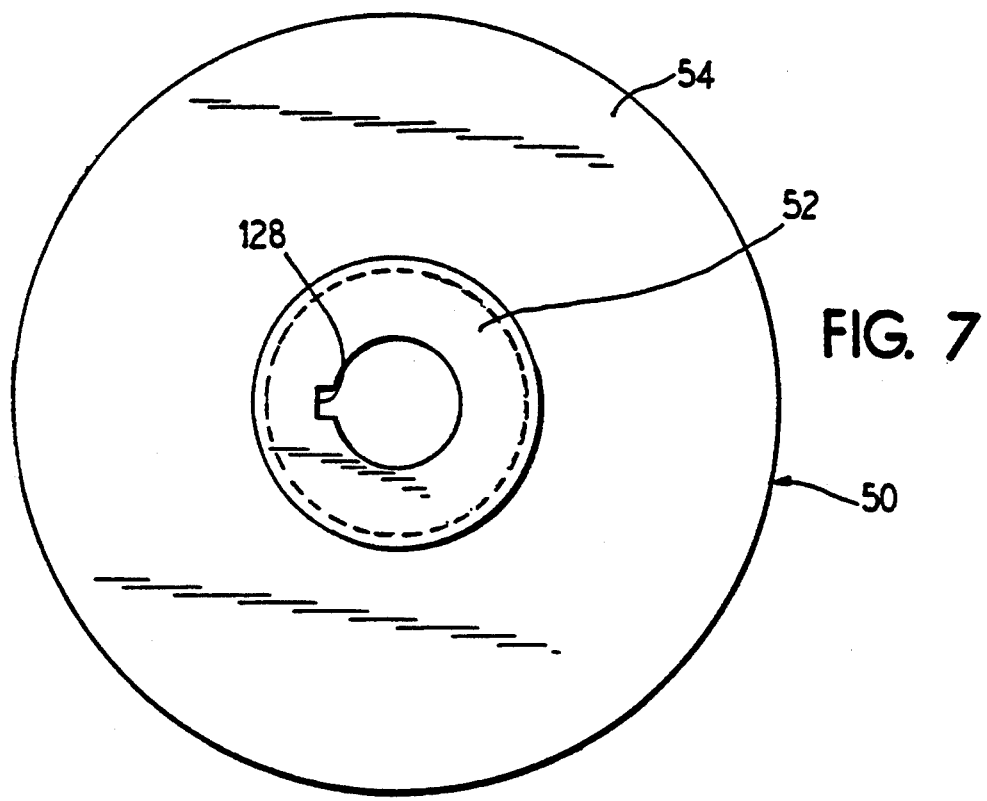
FIG. 7 is an elevational view of a rotor of the damper assembly of FIG. 1.

FIG. 7 shows the rotor 50 having the hub 52 and the disk 54 extending radially therefrom. The hub 52 provides the keyway 128 for locking the rotor 50 to the shaft 20.

Figure 8:
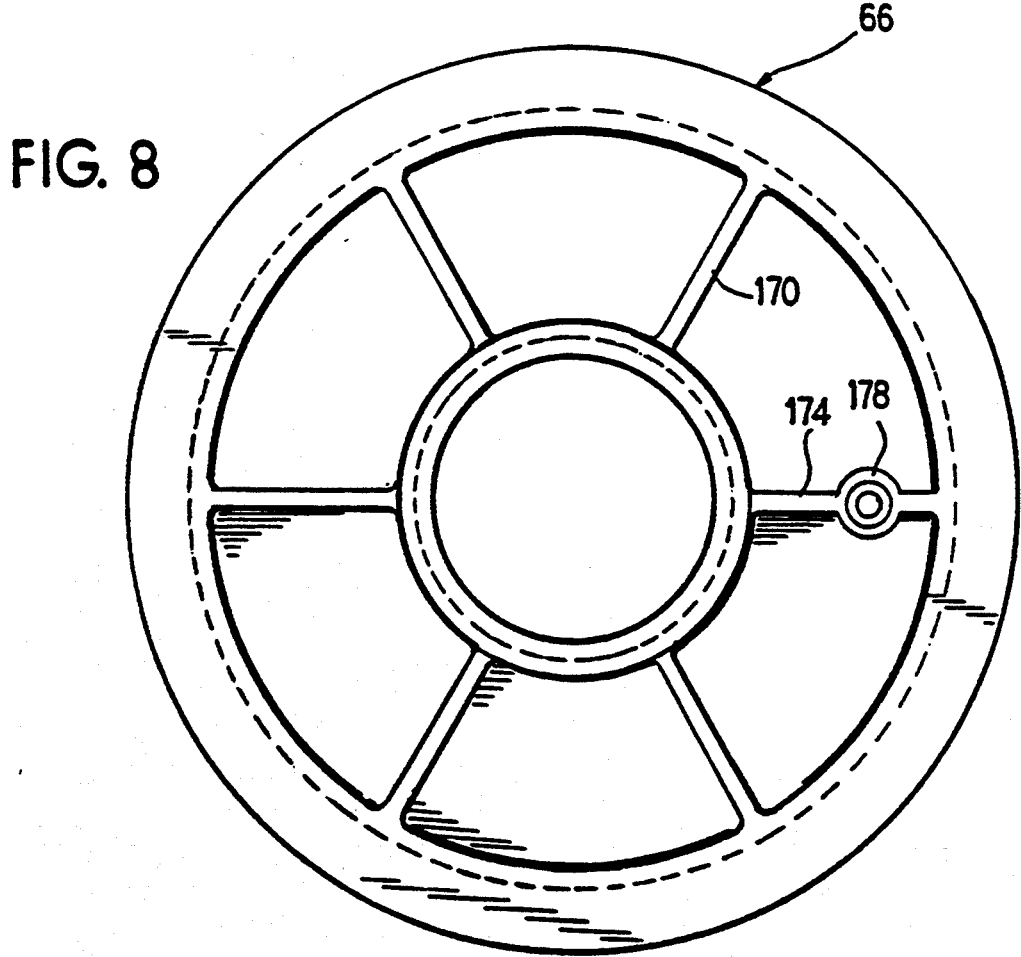
FIG. 8 is an elevational view of a cover plate for the damper assembly of FIG. 1.

FIG. 8 shows the cover 66 in more detail. The cover also comprises a plurality of reinforcing gussets 170 arranged at 60° around the circumference of the cover. Through one special reinforcing gusset 174, a viscous material fitting 178 is provided for injecting the viscous material between the cover and the disk 54.

As one advantage of the invention the rotor 50, the housing 60, and the cover 66 are all made of the same composite material.

Although the present invention has been described with reference to a specific embodiment, those of skill in the art will recognize that changes may be made thereto without departing from the scope and spirit of the invention as set forth in the appended claims.

The invention claimed is:

1. A viscous damping unit for retarding the rotation of a shaft comprising:
   a rotor comprising a disk extending radially from a hub portion having an axial bore therethrough configured for insertion of and connection to the shaft;
   a housing closely surrounding both opposite sides of said disk and having a through bore aligned with said axial bore, a viscous fluid applied between opposing surfaces of said disk and said housing;
   means for axially connecting said housing to a further housing of another damping unit arranged in axial alignment along an axis of said axial bore; and
   means for fixing at least one of said housing and said further housing to a structure.

2. The damping unit according to claim 1, wherein said means for axially connecting comprises a hole in the housing aligned with an identical hole in the further housing and a pin protruding through said hole and said identical hole.

3. The damping unit according to claim 1, wherein said housing comprises a journal portion sized to accept a portion of said hub portion thereinto, a disk portion connected to and surrounding said journal portion, and a ring portion surrounding and connected to said disk portion, wherein said disk portion comprises a plurality of reinforcing gussets arranged between said ring portion and said journal portion.

4. The damping unit according to claim 1, wherein said housing comprising a cover for installing said rotor within said housing, and said housing, said rotor, and said cover all comprise composite cast material.

5. The damping unit according to claim 1, wherein said axial bore comprises a keyway for fixing said shaft to said rotor for rotation.

6. The damping unit according to claim 1, wherein said housing comprises a circular enclosure with a plurality of lugs extending radially therefrom and spaced apart around the circumference, and wherein a plurality of said lugs comprise channels passing axially through said lugs.

7. A viscous damper arrangement for retarding rotation of a shaft, comprising a plurality of damper units, each unit comprising:
   a rotor adapted to be connected to the shaft for rotation therewith, the rotor having a disk shaped to extend radially and coaxially from the shaft, and
   a housing surrounding both opposite sides of said disk providing a gap between said housing and at least one face of said disk, said housing providing a fitting for injecting viscous material into said gap, said housing providing means for connecting said housing to an identical housing of another damper of said plurality of damper units arranged axially aligned and adjacently thereto, and said housing providing a means for selectively connecting said housing to a framework to selectively prevent rotation of said housing with respect to said framework.

8. The damper arrangement according to claim 7, wherein said housing comprises two pieces, said pieces located on opposite sides of said disk, said two pieces mating together for installing said rotor within said housing.

9. The damper according to claim 7, wherein said housing comprising a separate cover for installing said rotor within said housing, and said housing, said rotor, and said cover all comprise composite cast material.

10. A viscous damping unit assembly for retarding the unrolling and lowering speed of a curtain-type fire door coiled on a horizontal shaft, said shaft rotatably mounted to a stationary framework, comprising a plurality of damper units, each unit comprising:
- a rotor connectable to the shaft for rotation therewith, the rotor having a disk shaped to extend radially and coaxially from the shaft, and
- a housing surrounding both opposite sides of said disk providing a gap between said housing and at least one face of said disk, said housing providing a fitting for injecting viscous material into said gap, said housing providing means for connecting said housing to an identical housing of another damping unit assembly arranged axially aligned and adjacently thereto, and said housing providing a means for selectively fixing said housing to the framework to selectively prevent rotation with respect to the framework.

11. The apparatus of claim 10, wherein said means for connecting said housing to an identical housing comprises a lug arranged on each housing having a bore therethrough, said bores coaxially aligned, and a pin sized having a length to extend through said coaxially aligned bores to couple said plurality of damper units together.

12. The apparatus of claim 11, wherein said means for selectively connecting said housing to said framework comprises a plurality of notches arranged around a circumference of said housing and a ratchet mounted pivotably with respect to said fire door and having a finger portion spring biased to protrude into and be pivoted out of, said notches successively during rotation of said housing in a first direction of rotation with respect to said shaft, but interlocked with one of said notches upon rotation of said shaft in a second direction to prevent rotation of said housing in said second direction.

13. A viscous damper arrangement for retarding rotation of a shaft, comprising:
- a rotor connectable to the shaft for rotation therewith, a rotor having a disk shaped to extending radially and coaxially from the shaft; and
- a housing surrounding both opposite sides of said disk providing a gap between said housing and at least one face of said disk, said housing providing a fitting for injecting viscous shear resistant material into said gap, said housing and said rotor both comprising reinforced composite cast plastic material.

14. The arrangement according to claim 13 wherein said composite cast plastic material comprises a polycarbonate material with 30% glass reinforcement.

15. The arrangement according to claim 13 wherein said rotor comprises a hub portion having an axial bore therethrough, and said housing comprises a journal portion sized to accept a portion of said hub thereinto, a disk portion connected to and surrounding said journal portion, and a ring portion surrounding and connected to said disk portion, and a plurality of lugs extending radially from said ring portion, and a plurality of reinforcing gussets arranged integrally with said disk portion and radially extending from said journal portion to said ring portion spaced apart around a circumference of said disk portion.

16. The arrangement according to claim 15 wherein said housing comprises a separate cover arranged on one side of said disk, said separate cover having a second journaled portion for receiving an opposite axial side of said hub, and a second disk portion extending radially from said second journal portion, and a second ring portion extending around said second disk portion, and a second series of reinforcing gussets arranged between said second journal portion and said second ring portion formed integral with said second disk portion, and spaced apart around the circumference of said second ring portion.

17. The damping unit according to claim 13, wherein said housing comprises a circular enclosure with a plurality of lugs extending radially therefrom and spaced apart around the circumference, and wherein a plurality of said lugs comprise channels passing axially through said lugs.

18. A viscous damper arrangement for retarding rotation of a shaft, comprising:
- a rotor connectable to the shaft for rotation therewith, a rotor having a disk shaped to extending radially and coaxially from the shaft; and
- a housing surrounding both opposite sides of said disk providing a gap between said housing and at least one face of said disk, said housing providing a fitting for injecting viscous shear resistant material into said gap, said housing and said rotor both comprising reinforced composite cast plastic material;
- wherein said rotor comprises a hub portion having an axial bore therethrough, and said housing comprises a journal portion sized to accept a portion of said hub thereinto, a disk portion connected to and surrounding said journal portion, and a ring portion surrounding and connected to said disk portion, and a plurality of lugs extending radially from said ring portion, and a plurality of reinforcing gussets arranged integrally with said disk portion and radially extending from said journal portion to said ring portion spaced apart around a circumference of said disk portion; and
- wherein said housing comprises a separate cover arranged on one side of said disk, said separate cover having a second journaled portion for receiving an opposite axial side of said hub, and a second disk portion extending radially from said second journal portion, and a second ring portion extending around said second disk portion, and a second series of reinforcing gussets arranged between said second journal portion and said second ring portion formed integral with said second disk portion, and spaced apart around the circumference of said second ring portion.

* * * * *